US011436062B2

(12) United States Patent
Vajravel et al.

(10) Patent No.: US 11,436,062 B2
(45) Date of Patent: Sep. 6, 2022

(54) SUPPORTING UNIVERSAL WINDOWS PLATFORM AND WIN32 APPLICATIONS IN KIOSK MODE

(71) Applicant: Dell Products L.P., Round Rock, TX (US)

(72) Inventors: Gokul Thiruchengode Vajravel, Bangalore (IN); Ramanujam Venkatesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 360 days.

(21) Appl. No.: 16/780,077

(22) Filed: Feb. 3, 2020

(65) Prior Publication Data

US 2021/0240552 A1 Aug. 5, 2021

(51) Int. Cl.
*G06F 9/54* (2006.01)
*G06F 9/445* (2018.01)
*G06F 9/451* (2018.01)

(52) U.S. Cl.
CPC .......... *G06F 9/541* (2013.01); *G06F 9/44521* (2013.01); *G06F 9/452* (2018.02)

(58) Field of Classification Search
CPC ...... G06F 9/541; G06F 9/44521; G06F 9/452; G06F 9/445
See application file for complete search history.

(56) References Cited

U.S. PATENT DOCUMENTS 10,365,909 B2 * 7/2019 Clothier .............. G06F 9/45504
10,771,393 B1 * 9/2020 Korobov ................. H04L 47/25
2004/0039827 A1 * 2/2004 Thomas ................ H04L 63/168 709/228
2013/0339498 A1 * 12/2013 Johnson ................ H04L 67/104 709/221
2018/0061361 A1 * 3/2018 Peshkar .................. H04L 67/12
2018/0285554 A1 * 10/2018 Biswas ............... G06F 21/6281

(Continued)

OTHER PUBLICATIONS

Biswas ("Packaging a UWP application with a Win32 component in the right way" pp. 1-10, Jan. 15, 2019) (Year: 2019).*

(Continued)

*Primary Examiner* — S. Sough
*Assistant Examiner* — Phuong N Hoang
(74) *Attorney, Agent, or Firm* — Kirton McConkie; Brian Tucker

(57) ABSTRACT

A hook driver and a UWP load modifier can be employed on a Windows device to modify the process of loading UWP applications so that both UWP and Win32 applications can be run in kiosk mode without needing to run Windows Explorer in a typical manner. To accomplish this, the UWP load modifier can implement a proxy function that is called when the UWP loader attempts to launch a UWP application. In some configurations, when the proxy function is called, it can start Windows Explorer, cause the UWP application to be launched while Windows Explorer is running and then stop Windows Explorer once the UWP application is launched. In other configurations, when the proxy function is called, it can cause the UWP application to be launched in a separate desktop in which Windows Explorer is running and then, after it is launched, move the UWP application to the default desktop.

20 Claims, 13 Drawing Sheets

(56) References Cited

U.S. PATENT DOCUMENTS

2019/0087210 A1* 3/2019 Dowling ............ G06F 9/45504
2019/0310866 A1* 10/2019 Chinnathambi .......... G06F 8/38

OTHER PUBLICATIONS

Article, ("Desktop Bridge—The Migrate phase: invoking a Win32 process from a UWP app". (Year: 2016).*
Brinkmann, ("Are the days of Windows UWP applications numbered?", May 9, 2019, pp. 1-25) (Year: 2019).*
Aruntalkstech, ("Launch a Universal App from a WPF App"), Aug. 12, 2015, pp. 1-9). (Year: 2015).*

* cited by examiner

SUPPORTING UNIVERSAL WINDOWS PLATFORM AND WIN32 APPLICATIONS IN KIOSK MODE

CROSS-REFERENCE TO RELATED APPLICATIONS

N/A

BACKGROUND

Microsoft's Universal Windows Platform (UWP) provides core APIs that are the same across all devices that run Windows 10. A UWP application can therefore be run on any Windows 10 device thereby eliminating the need to rewrite an application for each type of device. On the other hand, a Win32 application is a traditional Windows application that is based on the Win32 API. Windows 10 also provides a kiosk mode that can be used to run a single application (single-application kiosk mode) while preventing the user from accessing any functionality outside of the single application. It is also possible to use kiosk mode to run multiple applications (multiple-application kiosk mode).

A UWP application is in the form of a package. The package itself has an identifier (or "package ID") and also defines an identifier for each UWP application (or "application user model ID") that it contains. To launch a UWP application, the operating system retrieves the application user model ID from the package (e.g., using the GetPackageApplicationIDs function) and uses the application user model ID to activate the application (e.g., using the IApplicationActivationManager::ActivateApplication method). Yet, to perform this functionality, Windows Explorer must be present. Therefore, if Windows Explorer is not running on the device, it will not be possible to launch a UWP application.

A primary purpose of single-application kiosk mode is to replace Windows Explorer (the default shell) with another application (the custom shell). Therefore, it is not possible to run a UWP application in single-application kiosk mode. To avoid this issue, multiple-application kiosk mode could be used so that a shell capable of running a UWP application and the UWP application itself can be run. Although this approach allows a UWP application to be run in kiosk mode, the shell capable of running the UWP application cannot also run Win32 applications. Accordingly, current kiosk shells are not capable of running both UWP and Win32 applications. To address this issue, developers typically write custom Win32 wrappers for UWP applications, which is a rather burdensome task.

BRIEF SUMMARY

The present invention extends to methods, systems and computer program products for supporting UWP and Win32 applications in kiosk mode. A hook driver and a UWP load modifier can be employed on a Windows device to modify the process of loading UWP applications so that both UWP and Win32 applications can be run in kiosk mode without needing to run Windows Explorer in a typical manner. To accomplish this, the UWP load modifier can implement a proxy function that is called when the UWP loader attempts to launch a UWP application. In some configurations, when the proxy function is called, it can start Windows Explorer, cause the UWP application to be launched while Windows Explorer is running and then stop Windows Explorer once the UWP application is launched. In other configurations, when the proxy function is called, it can cause the UWP application to be launched in a separate desktop in which Windows Explorer is running and then, after it is launched, move the UWP application to the default desktop.

In some embodiments, the present invention is implemented as a method for launching a UWP application in kiosk mode. An attempt to launch a UWP application is intercepted and, in response, Windows Explorer is started. While Windows Explorer is running, the attempt to launch the UWP application is allowed to proceed thereby causing the UWP application to successfully launch. Then, after the UWP application has successfully launched, Windows Explorer is stopped.

In some embodiments, the present invention is implemented as a method for launching a UWP application in kiosk mode. An attempt to launch a UWP application in a first desktop is intercepted and, in response, the UWP application is caused to be launched in a second desktop. After the UWP application has been launched in the second desktop, the UWP application is moved to the first desktop.

In some embodiments, the present invention is implemented as computer storage media storing computer executable instructions which when executed implement a solution for launching a UWP application in kiosk mode. The solution is configured to intercept attempts to launch UWP applications. In response to intercepting an attempt to launch a first UWP application in a first desktop, the solution is configured to cause the first UWP application to be launched in a second desktop and, after the first UWP application has been launched in the second desktop, move the first UWP application to the first desktop.

In some embodiments, in response to intercepting an attempt to launch a second UWP application, the solution may also be configured to start Windows Explorer, allow the attempt to launch the second UWP application to proceed while Windows Explorer is running thereby causing the second UWP application to successfully launch, and, after the second UWP application has successfully launched, stop Windows Explorer.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
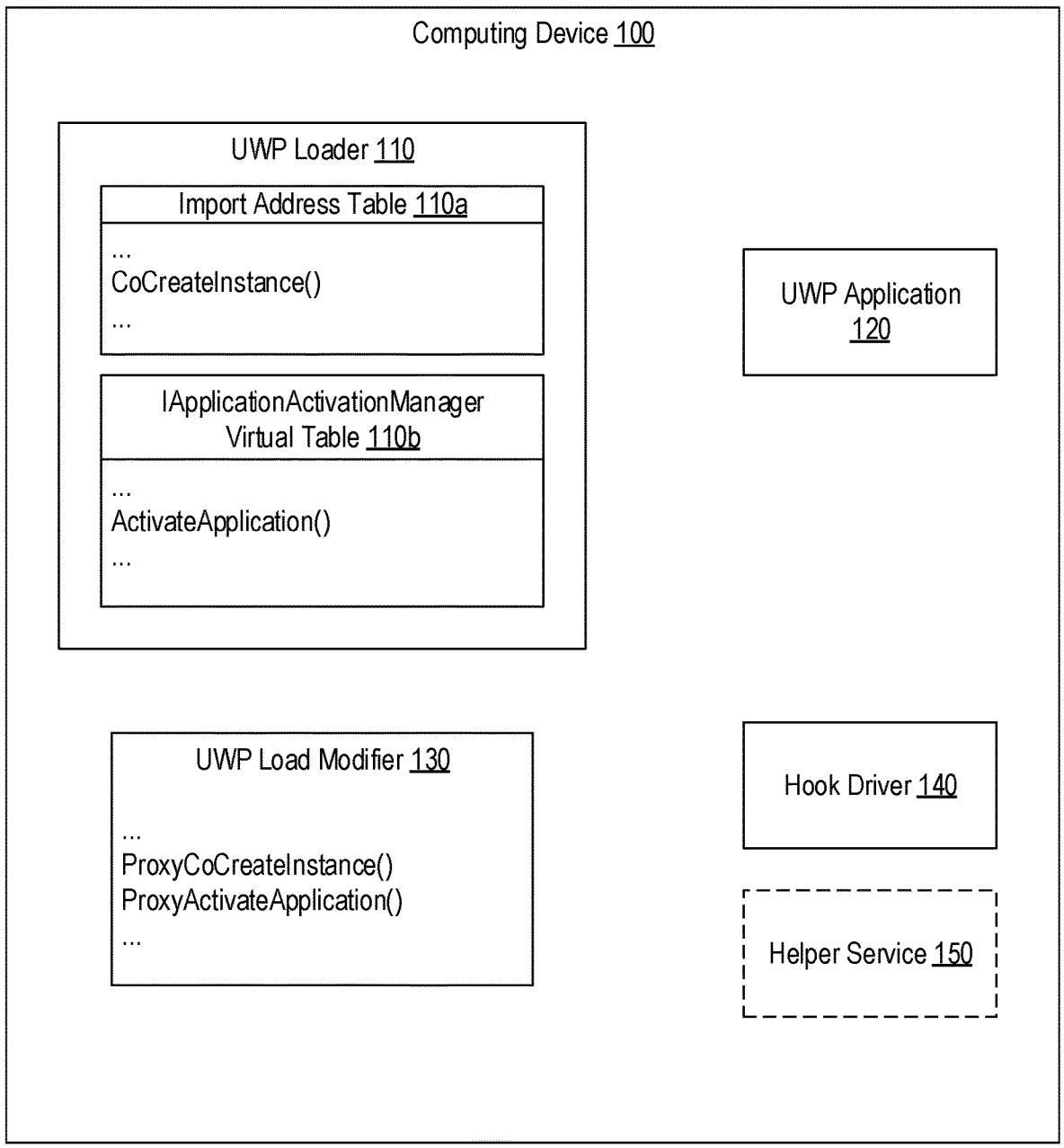
FIG. 1 illustrates various components that may be employed on a computing device to implement embodiments of the present invention.

FIG. 1 illustrates various software components on a computing device 100 that may be employed in implementations of the present invention. Computing device 100 can represent any type of computing device that is capable of running a version of Windows that supports kiosk mode (e.g., Windows 10). Although not shown, computing device 100 would include one or more processors, memory and other hardware to enable the Windows operating system and the depicted components to be executed.

A UWP loader 110, which may oftentimes be provided as part of the Windows operating system, is available on computing device 100. Among other things, UWP loader 110 includes an import address table 110*a* and a virtual table 110*b* for the IApplicationActivationManager interface. Import address table 110*a* defines function pointers which, at runtime, will define the addresses where the corresponding functions are loaded in virtual memory. Of relevance to the present invention, import address table 110*a* includes a function pointer for the CoCreateInstance function. Virtual table 110*b* is generally similar to import address table 110*a* and defines function pointers that are used to implement dynamic dispatch techniques. Of relevance to the present invention, virtual table 110*b* includes at least one function pointer for the ActivateApplication function (or method) of the IApplicationActivationManager interface.

FIG. 1 also shows that a UWP application 120 is available on computing device 100. It is noted that other UWP applications and even Win32 applications could be available for execution on computing device 100. As described below, embodiments of the present invention enable any UWP application available on computing device 100 to be run by modifying the loading process. Any Win32 application available on computing device 100 could also be run. In other words, any computing device that is configured in accordance with embodiments of the present invention can be operated in kiosk mode and run both UWP and Win32 applications.

To implement the techniques of the present invention, a UWP load modifier 130, a hook driver 140 and, in some embodiments, a helper service 150 can be installed on computing device 100. UWP load modifier 130 can represent an executable (e.g., a DLL) that is loaded when UWP loader 110 runs. Any suitable technique can be employed to accomplish this including, for example, any of the various DLL injection techniques. Among possibly other functionality, UWP load modifier 130 can implement proxy functions that are called when UWP loader 110 invokes the CoCreateInstance and ActivateApplication functions. Hook driver 140, which may be in the form of a kernel-mode component that is loaded at startup, can be employed in each of the various embodiments of the present invention. On the other hand, helper service 150 may only be employed in some embodiments as described below.

Figure 2A:
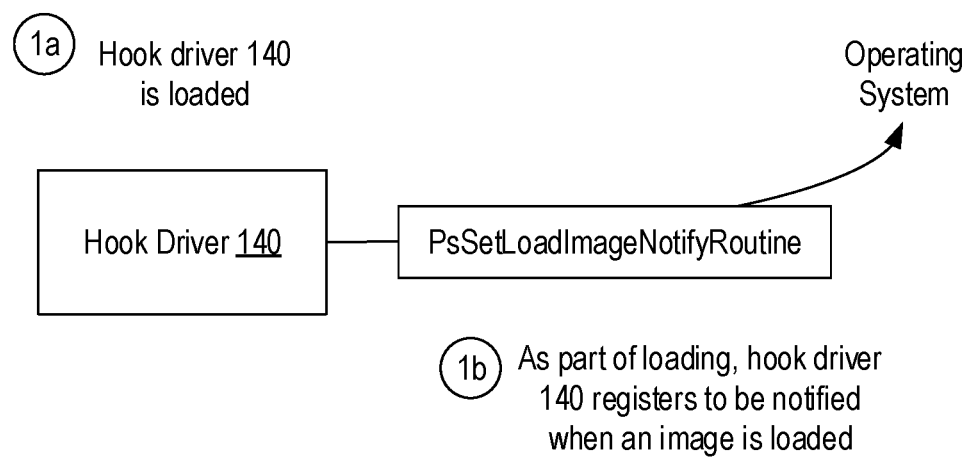
FIGS. 2A-2D illustrate how a hook driver and a UWP load modifier can be employed to enable the loading of a UWP application to be modified.

FIGS. 2A-2D illustrate an example of functionality that hook driver 140 and UWP load modifier 130 can perform to enable UWP load modifier 130 to modify the process of loading a UWP application. FIG. 2A represents functionality that would typically be performed at startup. In step 1*a*, hook driver 140 is loaded. As part of loading, in step 1*b*, hook driver 140 can register with the operating system to be notified whenever an image is loaded (or mapped into memory). For example, as part of its driver entry routine, hook driver 140 could call PsSetLoadImageNotifyRoutine to register a callback routine that the operating system will call when an image is loaded.

Figure 2B:
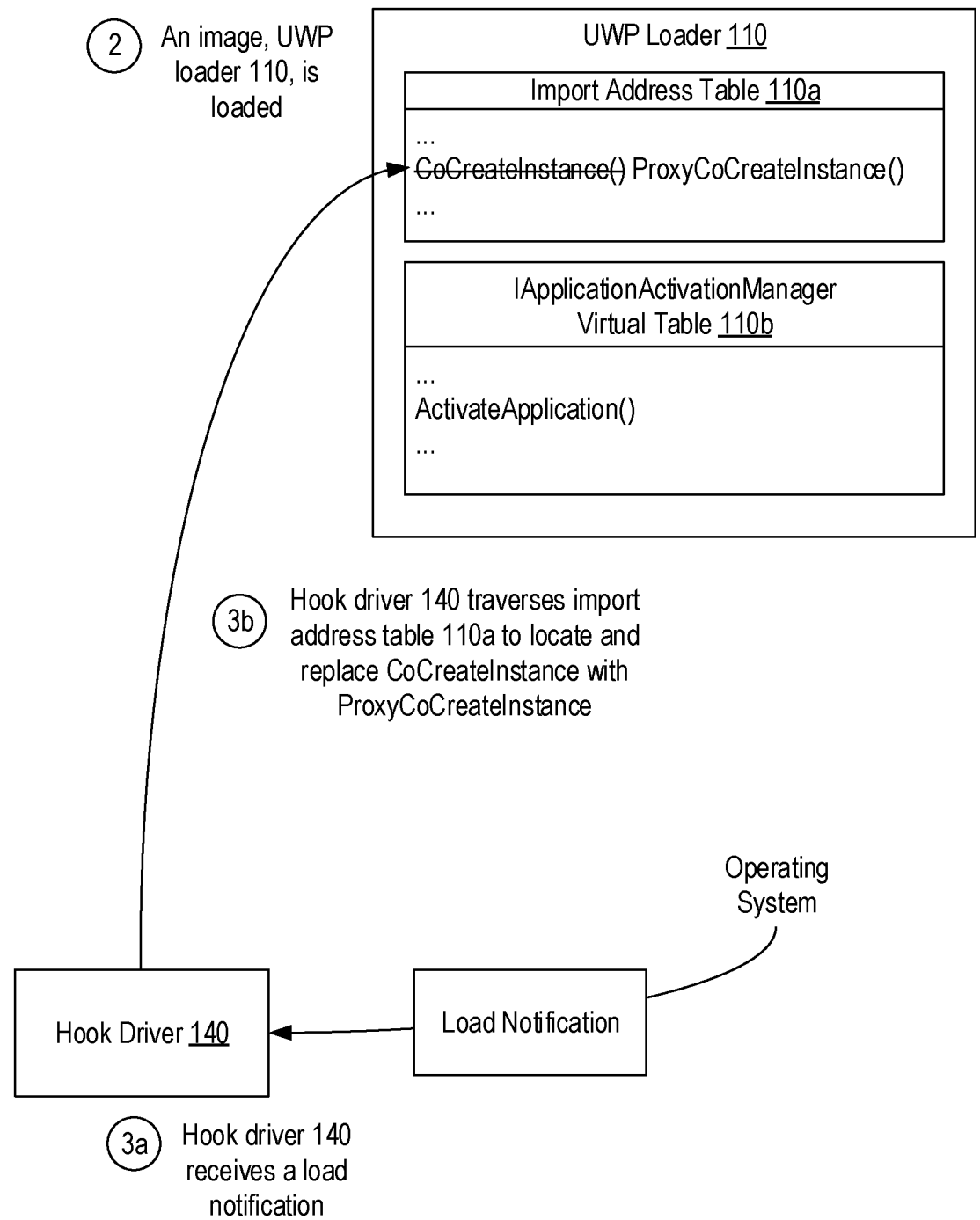

Turning to FIG. 2B, it is assumed that there has been a request to run a UWP application which in turn has caused the operating system to load UWP loader 110 in step 2. It is noted that, at this point, Windows Explorer is not running. Because hook driver 140 has registered to be notified when images are loaded, in step 3*a*, hook driver 140 will receive a load notification from the operating system. For example, the operating system can call the callback routine that hook driver 140 registered to provide hook driver 140 with information about the loaded image. This information may include the name of the image, the process ID of the process in which the image has been mapped, the base address of the image in virtual memory, etc. Although not shown, hook driver 140 may use this information to determine whether to take any action. For example, if the loaded image is not UWP loader 110, hook driver 140 may simply return. Alternatively, hook driver 140 may determine whether the loaded image is allowed (e.g., by comparing the image name to policy) and, if not, may block the image. Of primary relevance to the present invention, if the loaded image is UWP loader 110, in step 3*b*, hook driver 140 can employ the information to traverse import address table 110*a* to locate the function pointer to the CoCreateInstance function and replace it with a function pointer to the ProxyCoCreateInstance function that is implemented in UWP load modifier 130.

Figure 2C:
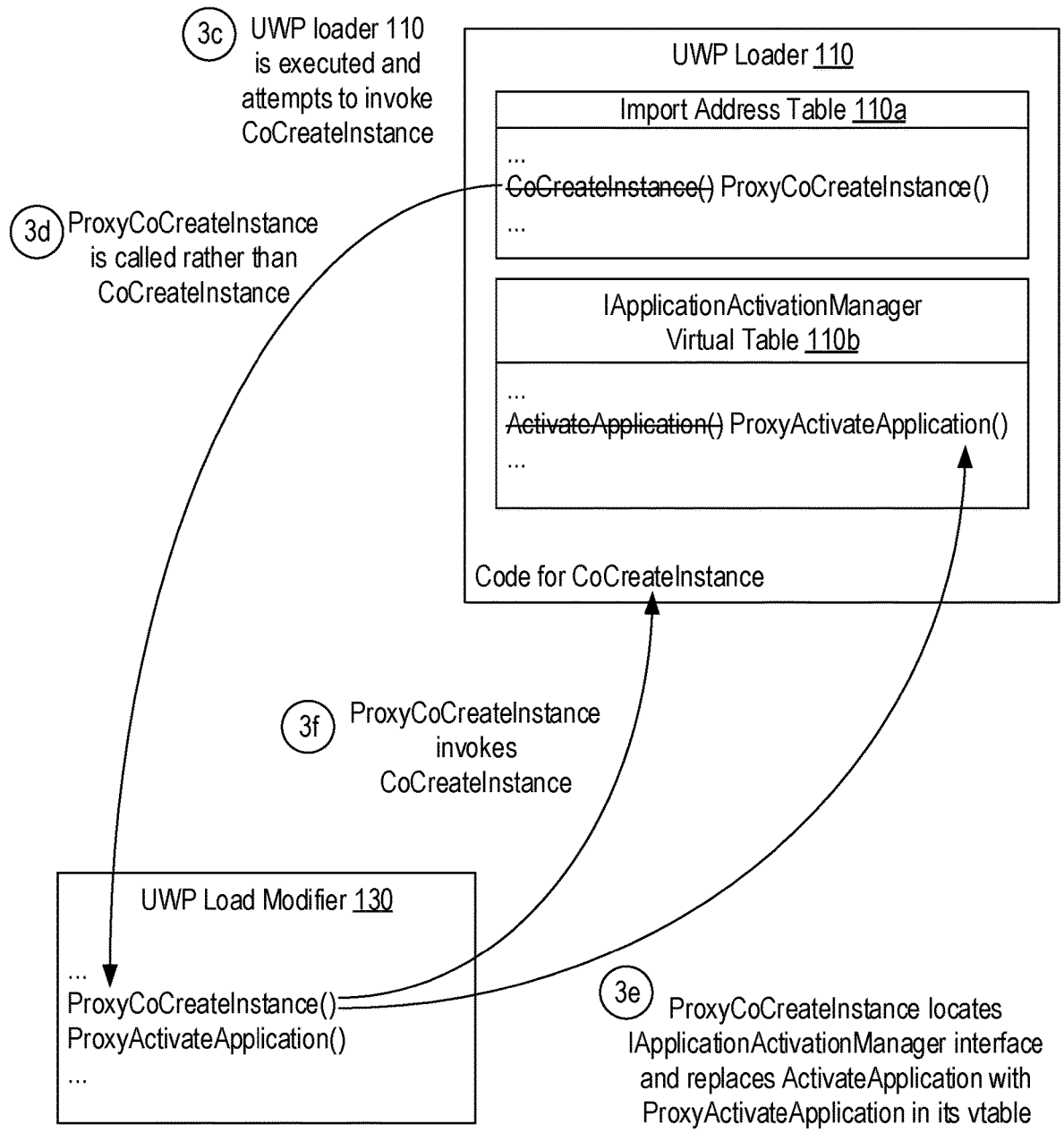

In step 3*c* shown in FIG. 2C, it is assumed that UWP loader 110 has commenced execution including attempting to invoke the CoCreateInstance function. However, because hook driver 140 modified import address table 110*a*, in step 3*d*, when UWP loader 110 attempts to invoke CoCreateInstance, UWP load modifier 130's ProxyCoCreateInstance function will be invoked. As represented by step 3*e*, the ProxyCoCreateInstance function is configured to search the virtual memory space of UWP loader 110 to identify IApplicationActivationManager virtual table 110*b* and replace any function pointer for ActivateApplication with a function pointer to UWP load modifier 130's ProxyActivateApplication function. Then, in step 3*f*, the ProxyCoCreateInstance function invokes the CoCreateInstance function and returns to allow UWP loader 110 to continue its execution.

Figure 2D:
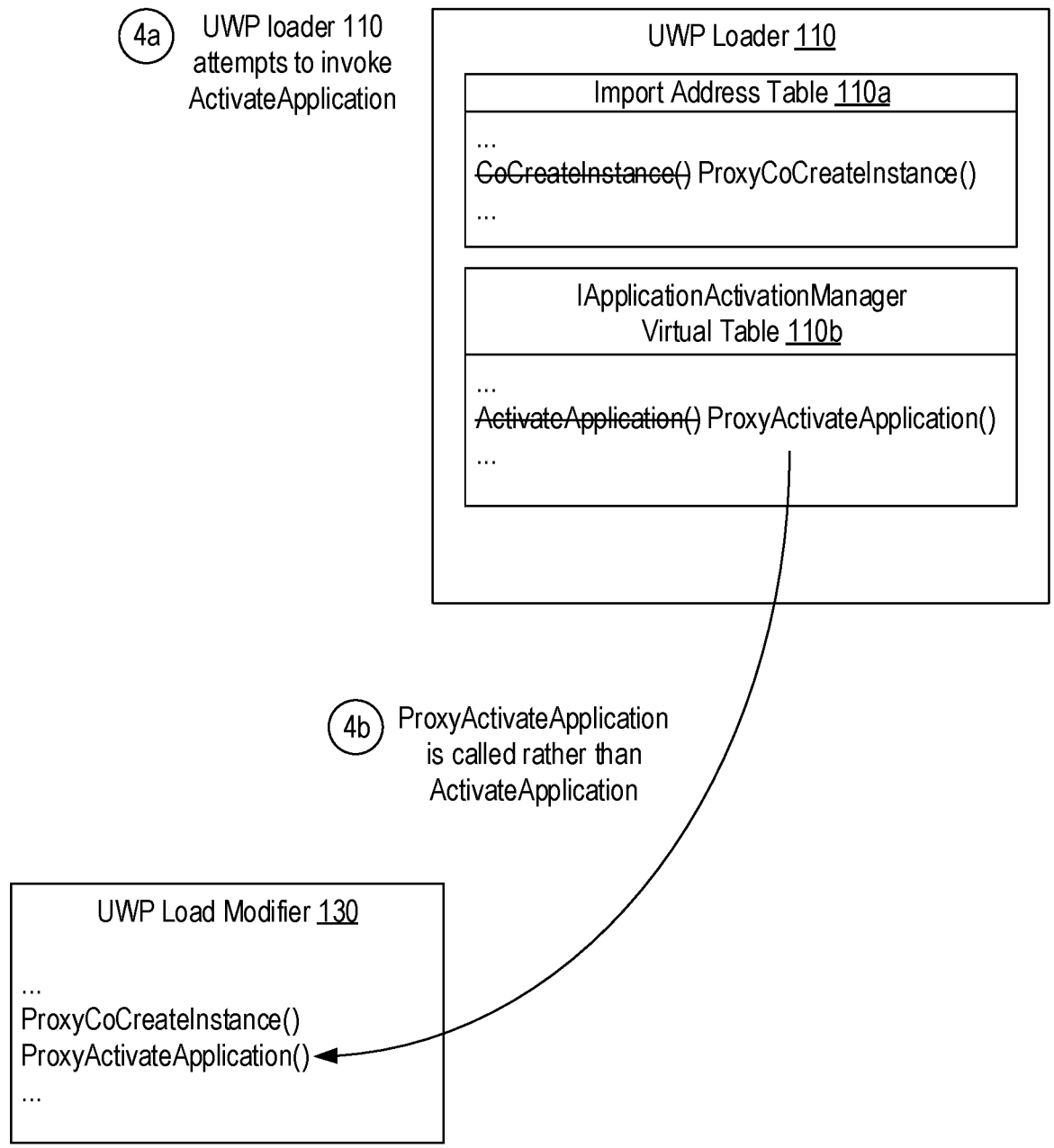

Turning to FIG. 2D, UWP loader 110's continued execution includes attempting to invoke the ActivateApplication function to thereby launch UWP application 120. If the ActivateApplication function were actually executed at this point, UWP application 120 would fail to launch because Windows Explorer is not running. However, because of the modification to virtual table 110*b*, in step 4*b*, UWP loader 110's attempt to invoke ActivateApplication will actually invoke UWP load modifier 130's ProxyActivateApplication.

Figure 3A:
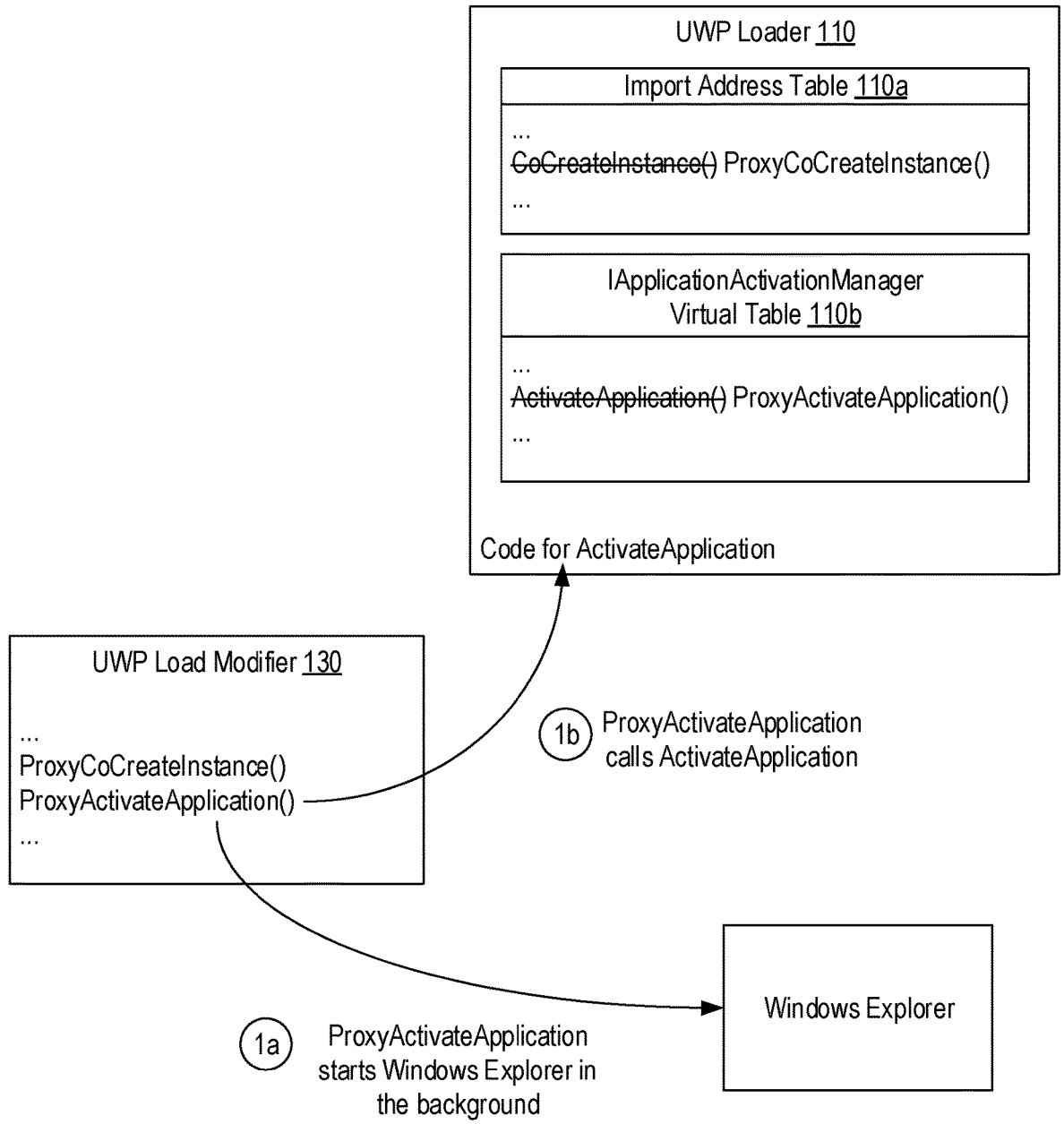
FIGS. 3A-3C illustrate one example technique by which a UWP load modifier enables a UWP application to be run.
Figure 3B:
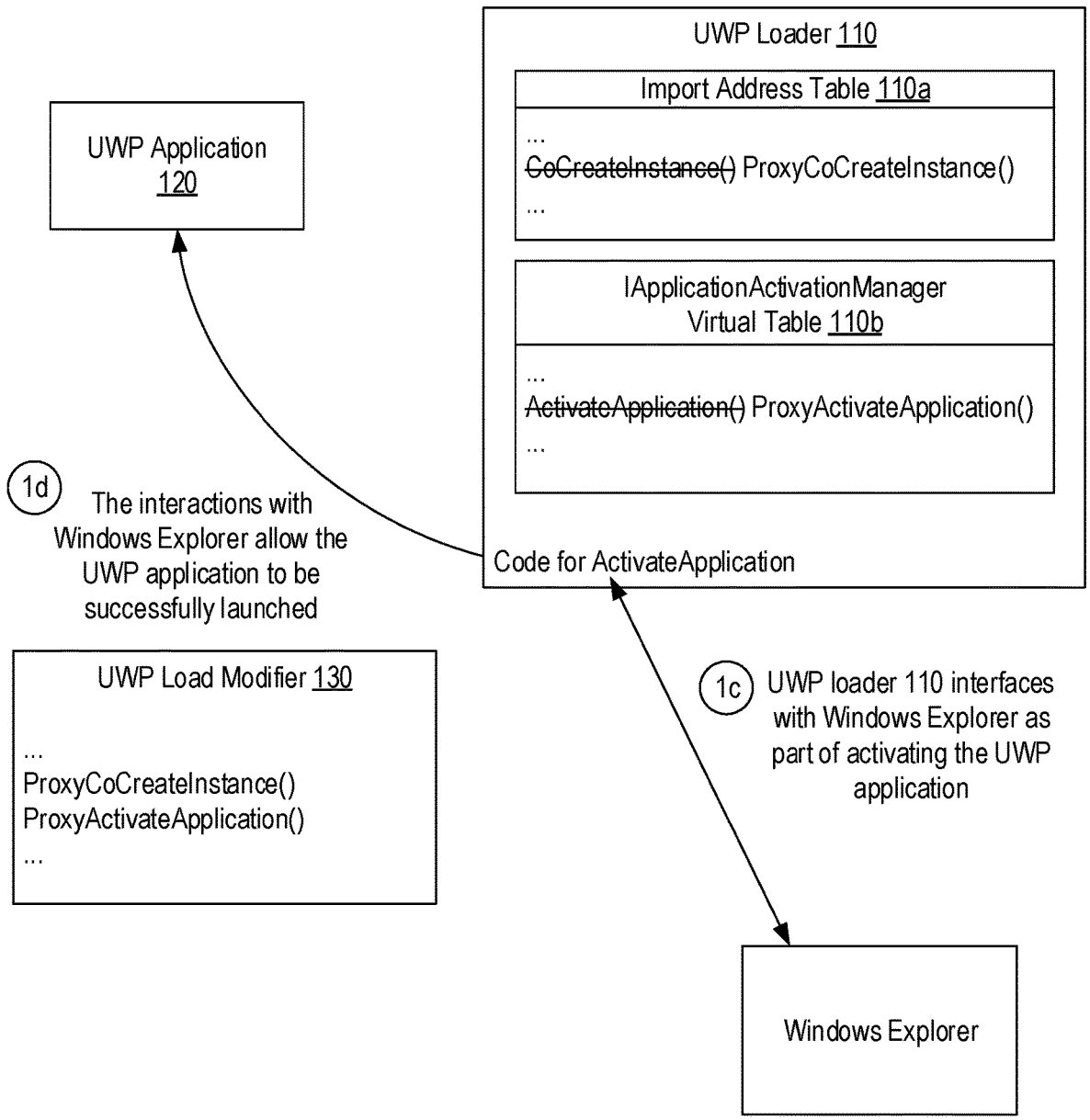
Figure 3C:
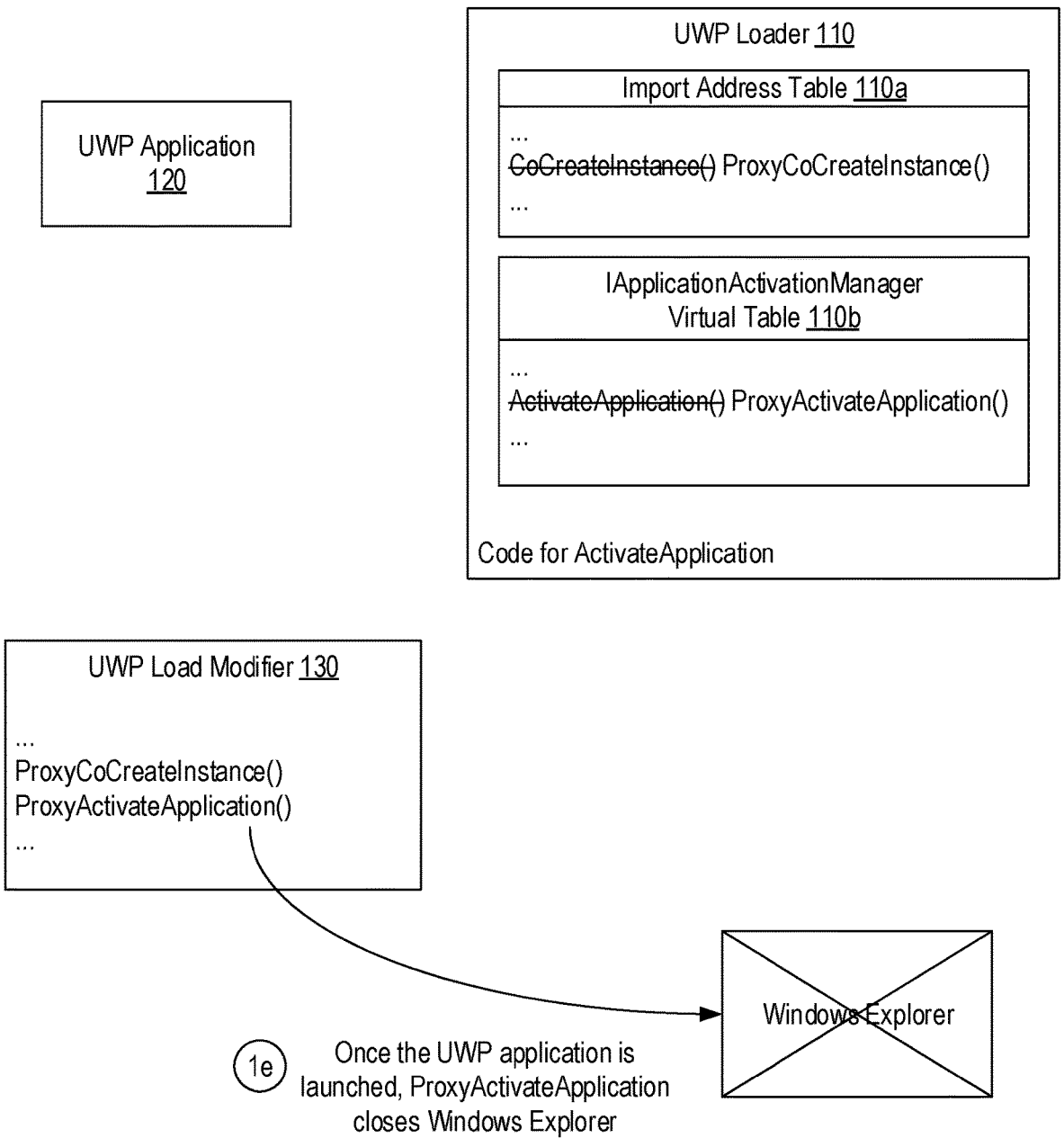
Figure 4A:
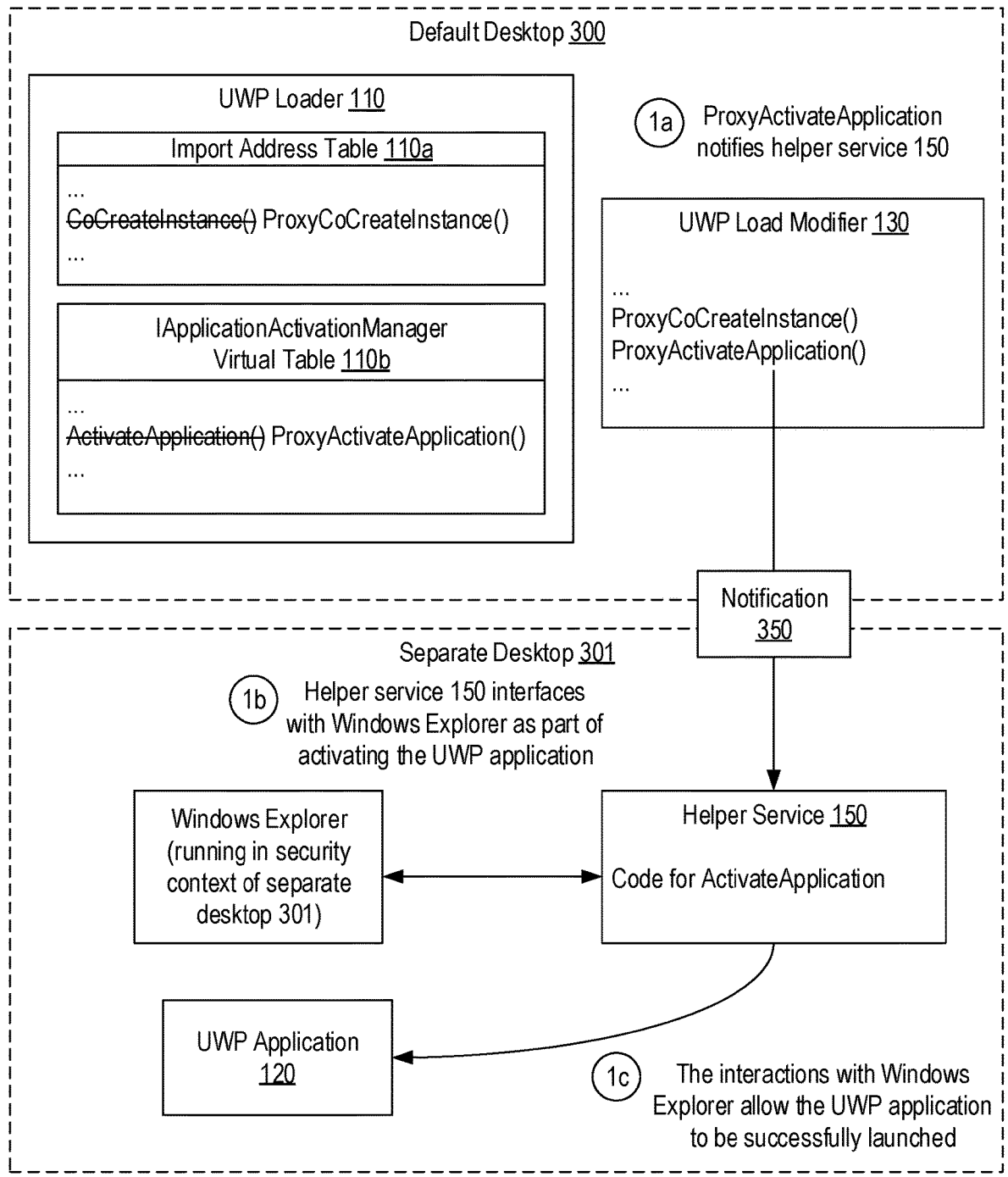
FIGS. 4A-4C illustrate another example technique by which the UWP load modifier enables a UWP application to be run.
Figure 4B:
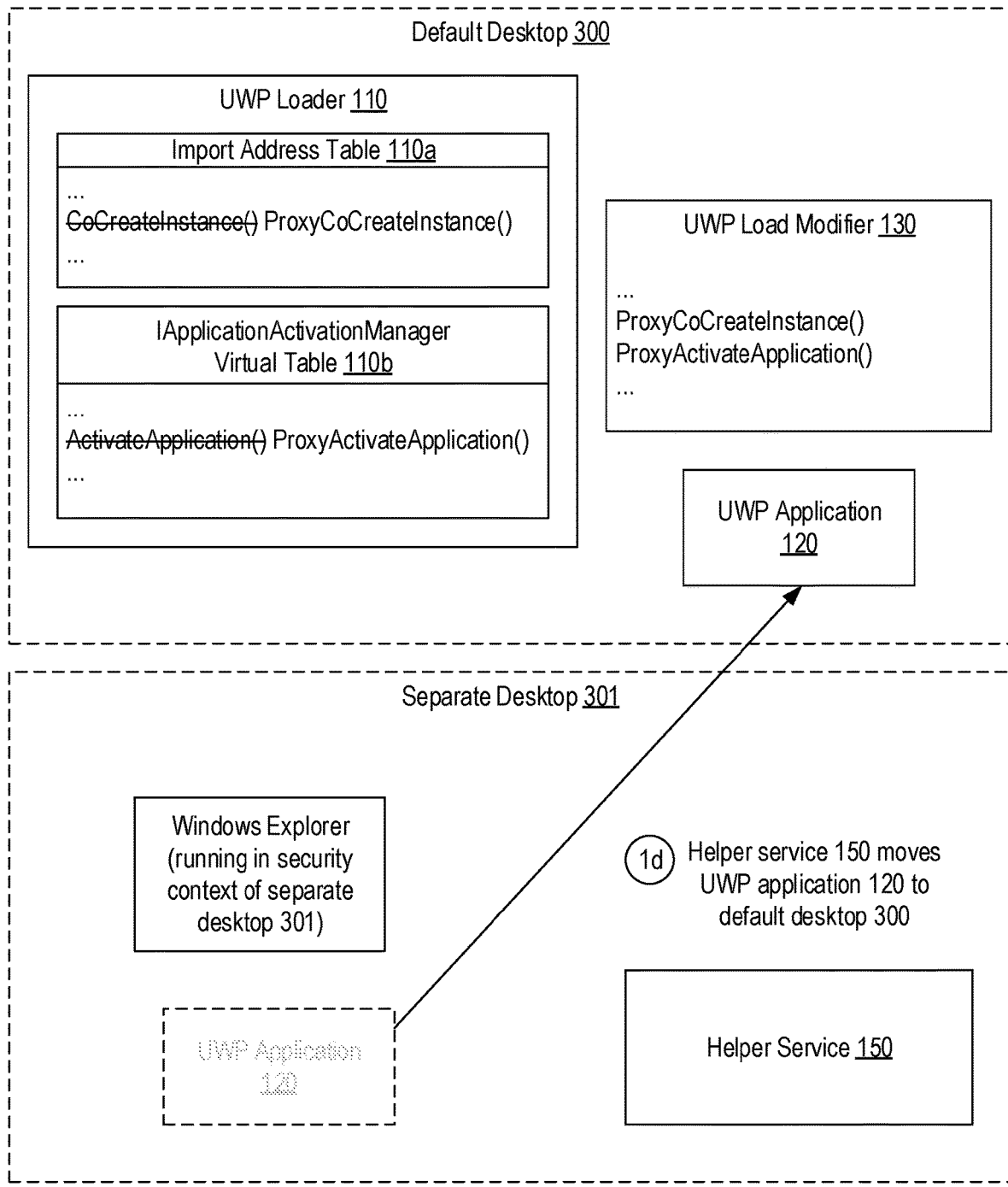
Figure 4C:
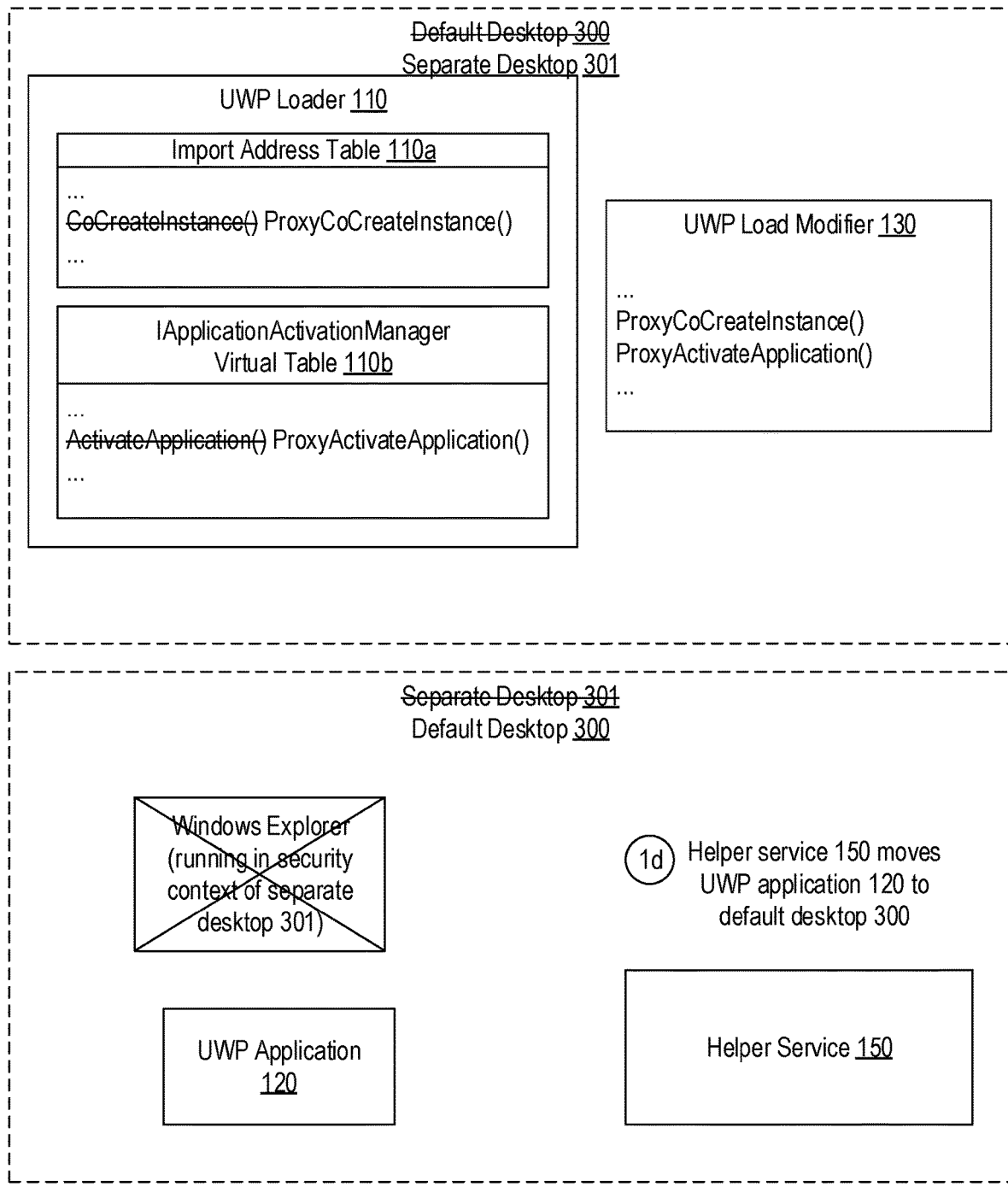

The ProxyActivateApplication function is configured to enable a UWP application to be successfully launched on computing device 100 even though Windows Explorer is not accessible to UWP loader 110 at the time it invokes the ActivateApplication function. The functionality that the ProxyActivateApplication performs may differ based on the resources available on computing device 100. FIGS. 3A-3C represent one example of the functionality that the ProxyActivateApplication function may perform which may be more suitable when computing device 100 has limited memory (e.g., less than 8 GB). FIGS. 4A-4C represent another example of the functionality that the ProxyActivateApplication function may perform which may be more suitable when computing device 100 does not have limited memory (e.g., 8 GB or more). In some embodiments, UWP load modifier 130 could be configured to dynamically determine available resources and then select which technique ProxyActivateApplication will employ to enable a UWP application to be launched. In other embodiments, UWP load modifier 130 could be preconfigured to use a particular technique.

With reference to FIG. 3A, when the ProxyActivateApplication function is invoked, in step 1a, it can start Windows Explorer in the background. With Windows Explorer now running, the ProxyActivateApplication function can then invoke the ActivateApplication function (e.g., using the function pointer that it replaced in virtual table 110b) consistent with UWP loader 110's original attempt to invoke this function. For example, UWP loader 110's attempt to invoke the ActivateApplication function would have specified the application user model ID of the UWP application to be launched (which is assumed to be UWP application 120). The ProxyActivateApplication function can pass this application user model ID (and the other parameters) in its call to the ActivateApplication function.

As represented in FIG. 3B as step 1c, the ActivateApplication function will interface with Windows Explorer as part of activating UWP application 120 (e.g., by calling APIs that Windows Explorer exports). These interactions with Windows Explorer will allow UWP application 120 to be successfully launched in step 1d. Once the ActivateApplication function has completed successfully, in step 1e, the ProxyActivateApplication can close Windows Explorer and return. In this way, UWP load modifier 130 causes Windows Explorer to run only long enough to launch UWP application 120. Considering that this process will happen very quickly, there will be virtually no opportunity for a user to employ Windows Explorer to improperly access functionality of computing device 100.

In the technique of FIGS. 3A-3C, because Windows Explorer is run in the security context of the default desktop, the technique consumes minimal resources. However, even though Windows Explorer is only running for a short time, the fact that it is running in the default desktop (i.e., the desktop that receives user input) still creates a security vulnerability that could be exploited. Accordingly, this technique may be best suited for computing devices lacking sufficient RAM to support the technique of FIGS. 4A-4C.

The technique of FIGS. 4A-4C employs helper service 150. With reference to FIG. 4A, when the ProxyActivateApplication function is invoked, in step 1a, it can send a notification 350 to (or otherwise invoke) helper service 150. Notification 350 can include the parameters of UWP loader 110's call to the ActivateApplication function. If helper service 350 has not already done so, it can create separate desktop 301 and/or start Windows Explorer in separate desktop 301. In accordance with the Windows security architecture, a security boundary will exist between default desktop 300 and separate desktop 301. Therefore, processes running on default desktop 300, including UWP loader 110, will not be able to access Windows Explorer. For this reason, helper service 150 could create separate desktop 301 and run Windows Explorer at startup so that it is already running when notification 350 is received.

With Windows Explorer running in separate desktop 301, helper service 150 can invoke the ActivateApplication function in the context of separate desktop 301. As a result, in step 1b, helper service 150 will interface with Windows Explorer as part of activating UWP application 120. These interactions will cause UWP application 120 to be launched in the context of separate desktop 301 in step 1c.

FIGS. 4B and 4C each illustrate a suitable way in which UWP application 120 can be moved to default desktop 300 (i.e., the visible desktop) once it is launched. As shown in FIG. 4B, once UWP application 120 is successfully launched, in step 1d, helper service 150 can move UWP application 120 to default desktop 300 where its user interface will be visible and accessible to the end user. In this context, UWP application 120 is moved by changing which desktop is assigned to it. At this point, helper service 150 could close Windows Explorer and possibly separate desktop 301 but need not do so given that processes running on default desktop 300, as well as the user, will not have access to Windows Explorer. This technique may be best suited for computing devices having RAM sufficient for two desktops.

In contrast, in FIG. 4C, step 1d of moving UWP application 120 to the default desktop 300 is accomplished by making separate desktop 301 the default desktop (e.g., by calling SwitchDesktop). In such cases, helper service 150 can close Windows Explorer before switching the default desktop so that Windows Explorer will not be accessible in the default desktop.

Using the techniques of the present invention, a computing device could be deployed with a custom shell (e.g., a shell that replaces Windows Explorer) without losing the ability to run Win32 and UWP applications. As an example use case, the custom shell could provide a desktop interface that provides the user with the option of running multiple applications including both Win32 and UWP applications. In such a case, when the user selects a UWP application, one of the above-described techniques could be employed to launch the UWP application. In contrast, when the user selects a Win32 application, the application would be loaded in a typical fashion using the Win32 APIs that do not require Windows Explorer to be running. Notably, due to the techniques of the present invention, the applications themselves do not need to be modified in any way (e.g., by writing Win32 wrappers for the UWP applications). Accordingly, from an administrator's perspective, the present invention makes it much easier to deploy custom kiosk solutions.

Figure 5:
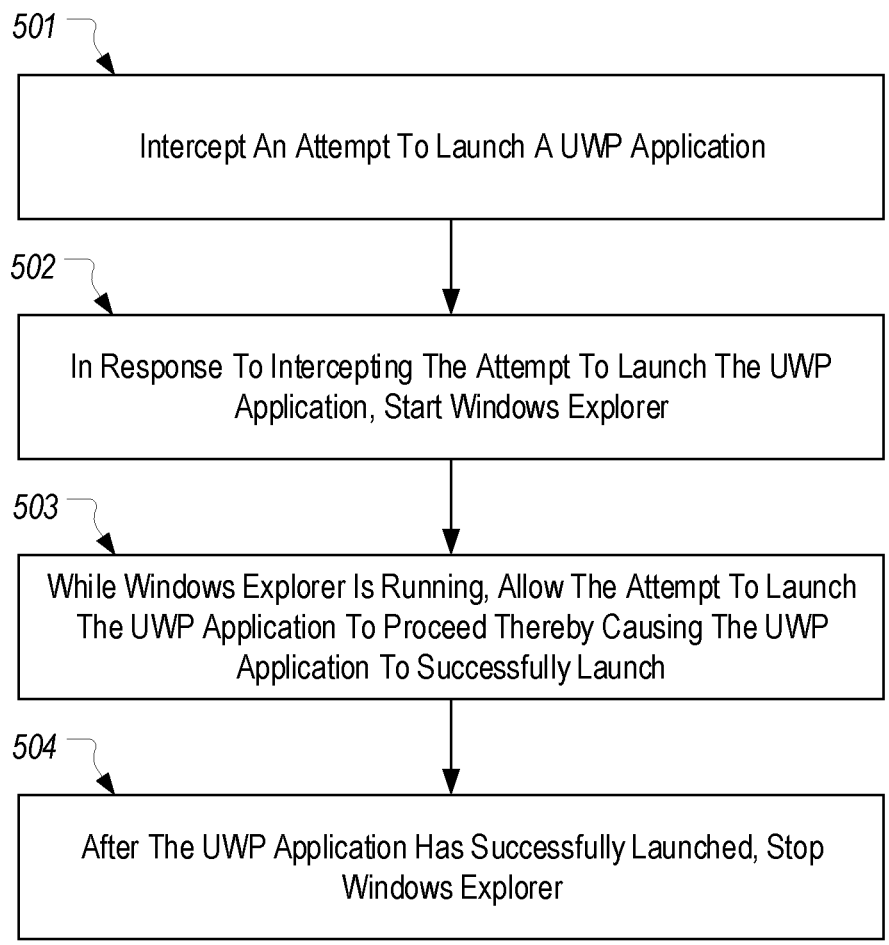
FIG. 5 provides a flowchart of an example method for launching a UWP application in kiosk mode.

FIG. 5 provides a flowchart of an example method 500 for launching a UWP application in kiosk mode. Method 500 generally corresponds with the functionality depicted in FIGS. 3A-3C and may be implemented by UWP load modifier 130 possibly in conjunction with other components depicted in FIG. 1.

Method 500 includes an act 501 of intercepting an attempt to launch a UWP application. For example, UWP load modifier 130's ProxyActivateApplication function can be called when UWP loader 110 attempts to invoke the ActivateApplication function of the IApplicationActivationManager interface.

Method 500 includes an act 502 of, in response to intercepting the attempt to launch the UWP application, starting Windows Explorer. For example, UWP load modifier 130's implementation of the ProxyActivateApplication function may define functionality for launching Windows Explorer (e.g., by calling CreateProcessA).

Method 500 includes an act 503 of, while Windows Explorer is running, allowing the attempt to launch the UWP application to proceed thereby causing the UWP application to successfully launch. For example, UWP load modifier 130's implementation of the ProxyActivateApplication function may call the ActivateApplication function.

Method 500 includes an act 504 of, after the UWP application has successfully launched, stopping Windows Explorer. For example, UWP load modifier 130's implementation of the ProxyActivateApplication function may define functionality for stopping Windows Explorer (e.g., by calling TerminateProcess).

Figure 6:
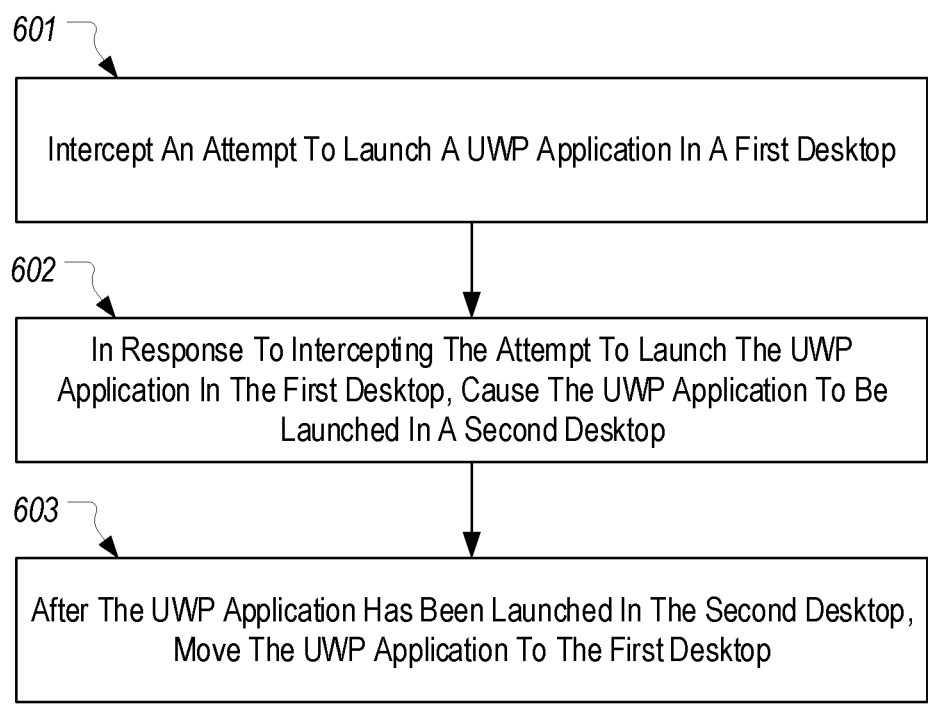
FIG. 6 provides a flowchart of another example method for launching a UWP application in kiosk mode.

FIG. 6 provides a flowchart of an example method 600 for launching a UWP application in kiosk mode. Method 600 generally corresponds with the functionality depicted in FIGS. 4A-4C and may be implemented by UWP load modifier 130 in conjunction with helper service 150 and possibly other components depicted in FIG. 1.

Method 600 includes an act 601 of intercepting an attempt to launch a UWP application in a first desktop. For example, UWP load modifier 130's ProxyActivateApplication function can be called when UWP loader 110, which may be running in the default desktop, attempts to invoke the ActivateApplication function of the IApplicationActivationManager interface.

Method 600 includes an act 602 of, in response to intercepting the attempt to launch the UWP application in the first desktop, causing the UWP application to be launched in a second desktop. For example, UWP load modifier 130's implementation of the ProxyActivateApplication function may invoke helper service 150 to cause it to call ActivateApplication in the context of separate desktop 301 where Windows Explorer is running.

Method 600 includes an act 603 of, after the UWP application has been launched in the second desktop, moving the UWP application to the first desktop. For example, helper service 150 can assign default desktop 300 to UWP application 120 (e.g., by causing SetThreadDesktop to be called using a handle to default desktop 300). Alternatively, helper service 150 could change separate desktop 301 to be the default desktop (e.g., by calling SwitchDesktop) which would cause default desktop 300 to no longer be the default desktop. Accordingly, moving the UWP application from one desktop to another should be construed as encompassing both changing the desktop that is assigned to the UWP application as well as changing which desktop is the default desktop (i.e., the first desktop can be viewed as the current default desktop and the second desktop can be viewed as not being the current default desktop). In instances where the UWP application is moved to the first desktop by making separate desktop 301 the default desktop, helper service 150 can stop Windows Explorer before making separate desktop 301 the default desktop.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media includes signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for launching a Universal Windows Platform (UWP) application in kiosk mode, the method comprising:
   intercepting an attempt to launch a UWP application;
   in response to intercepting the attempt to launch the UWP application, starting Windows Explorer™;
   while the Windows Explorer™ is running, allowing the attempt to launch the UWP application to proceed thereby causing the UWP application to successfully launch; and
   after the UWP application has successfully launched, stopping the Windows Explorer™.

2. The method of claim 1, wherein intercepting the attempt to launch the UWP application comprises modifying a virtual table.

3. The method of claim 2, wherein modifying the virtual table comprises replacing a pointer to a first function with a pointer to a second function, wherein the second function starts the Windows Explorer™, invokes the first function to allow the attempt to launch the UWP application to proceed and then stops the Windows Explorer™.

4. The method of claim 3, wherein the first function is ActivateApplication function of IApplicationActivationManager interface.

5. The method of claim 1, wherein allowing the attempt to launch the UWP application to proceed comprises calling ActivateApplication function.

6. The method of claim 1, wherein intercepting the attempt to launch the UWP application comprises:
   receiving a notification that a UWP loader has been loaded;
   modifying an import address table of the UWP loader by replacing a pointer to a first function with a pointer to a second function; and when the second function is called, modifying a virtual table of the UWP loader by replacing a pointer to a third function with a pointer to a fourth function;
wherein the fourth function starts the Windows Explorer™, invokes the third function to allow the attempt to launch the UWP application to proceed and then stops the Windows Explorer™.

7. A method for launching a Universal Windows Platform (UWP) application in kiosk mode, the method comprising:
intercepting an attempt to launch a UWP application in a first desktop;
in response to intercepting the attempt to launch the UWP application in the first desktop, causing the UWP application to be launched in a second desktop; and
after the UWP application has been launched in the second desktop, moving the UWP application to the first desktop.

8. The method of claim 7, wherein causing the UWP application to be launched in the second desktop comprises starting Windows Explorer™ on the second desktop.

9. The method of claim 8, wherein causing the UWP application to be launched in the second desktop comprises creating the second desktop.

10. The method of claim 7, wherein Windows Explorer™ is not running in the first desktop but is running in the second desktop when the UWP application is launched in the second desktop.

11. The method of claim 7, wherein intercepting the attempt to launch the UWP application in the first desktop comprises:
receiving a notification that a UWP loader has been loaded;
modifying an import address table of the UWP loader by replacing a pointer to a first function with a pointer to a second function; and when the second function is called, modifying a virtual table of the UWP loader by replacing a pointer to a third function with a pointer to a fourth function;
wherein the fourth function causes the UWP application to be launched in the second desktop causing a helper service to interface with Windows Explorer™ that is running in the second desktop.

12. The method of claim 11, wherein the helper service interfaces with the Windows Explorer™ by calling the third function.

13. The method of claim 12, wherein the first function is CoCreateInstance and the third function is ActivateApplication.

14. One or more computer storage media storing computer executable instructions which when executed implement a solution for launching a Universal Windows Platform (UWP) application in kiosk mode, the solution being configured to:
intercept attempts to launch UWP applications;
in response to intercepting an attempt to launch a first UWP application in a first desktop, cause the first UWP application to be launched in a second desktop; and
after the first UWP application has been launched in the second desktop, move the first UWP application to the first desktop.

15. The computer storage media of claim 14, wherein the solution is further configured to:
in response to intercepting an attempt to launch a second UWP application, start Windows Explorer™;
while the Windows Explorer™ is running, allow the attempt to launch the second UWP application to proceed thereby causing the second UWP application to successfully launch; and
after the second UWP application has successfully launched, stop the Windows Explorer™.

16. The computer storage media of claim 15, wherein intercepting attempts to launch UWP applications comprises, for each attempt:
receiving a notification that a UWP loader has been loaded;
modifying an import address table of the UWP loader by replacing a pointer to a first function with a pointer to a second function; and
when the second function is called, modifying a virtual table of the UWP loader by replacing a pointer to a third function with a pointer to a fourth function.

17. The computer storage media of claim 16, wherein the first function is CoCreateInstance and the third function is ActivateApplication.

18. The computer storage media of claim 14, wherein the solution is configured to prevent Windows Explorer™ from running in the first desktop and is configured to cause the Windows Explorer™ to run in the second desktop when the first UWP application is launched in the second desktop.

19. The computer storage media of claim 14, wherein the solution includes a shell that presents a user interface that enables users to launch one or more UWP applications and one or more Win32 applications.

20. The computer storage media of claim 14, wherein causing the first UWP application to be launched in the second desktop comprises creating the second desktop.

* * * * *